United States Patent
Murakami et al.

(10) Patent No.: US 9,420,660 B2
(45) Date of Patent: Aug. 16, 2016

(54) LIGHTING FIXTURE INCLUDING HUMAN DETECTING SENSOR

(71) Applicant: Panasonic Intellectual Property Management Co., Ltd., Osaka (JP)

(72) Inventors: Tadashi Murakami, Osaka (JP); Shigeo Gotou, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/437,359

(22) PCT Filed: Oct. 24, 2013

(86) PCT No.: PCT/JP2013/006282
§ 371 (c)(1),
(2) Date: Apr. 21, 2015

(87) PCT Pub. No.: WO2014/068911
PCT Pub. Date: May 8, 2014

(65) Prior Publication Data
US 2015/0289337 A1    Oct. 8, 2015

(30) Foreign Application Priority Data
Oct. 29, 2012    (JP) .................................. 2012-238042

(51) Int. Cl.
*H05B 33/08* (2006.01)
*H05B 37/02* (2006.01)
(Continued)

(52) U.S. Cl.
CPC .............. *H05B 33/0854* (2013.01); *F21S 8/088* (2013.01); *F21V 23/0442* (2013.01);
(Continued)

(58) Field of Classification Search
CPC ........... H05B 37/0218; H05B 37/0227; H05B 37/0272; H05B 33/0854; H05B 37/0245; H05B 37/0281; H05B 37/0254; H05B 37/0236; H05B 33/0845; H05B 37/02; H05B 37/0209; H05B 37/0263; H05B 33/0803; H05B 33/0815; H05B 33/0818; H05B 33/0842; H05B 33/0851; H05B 33/0869; H05B 33/0872; H05B 33/089; H05B 37/029; H05B 33/08; H05B 33/0809; H05B 33/0812; H05B 33/0857; H05B 33/086; H05B 33/0863; H05B 33/0896; H05B 37/03; H05B 37/04; H05B 3/008; H05B 41/36
See application file for complete search history.

(56) References Cited

U.S. PATENT DOCUMENTS

2012/0143383 A1* 6/2012 Cooperrider ............. H04Q 9/00
700/295

FOREIGN PATENT DOCUMENTS

JP    2008-270064 A    11/2008
JP    2010-272325 A    12/2010

OTHER PUBLICATIONS

International Search Report issued in PCT/JP2013/006282, dated Jan. 28, 2014, with English translation.

*Primary Examiner* — Jany Richardson
(74) *Attorney, Agent, or Firm* — McDermott Will & Emery LLP

(57) ABSTRACT

A controller of a lighting fixture is configured to set a light modulation level of an LED to a first light modulation level in a period from a beginning of a night time slot until when a predetermined first time period elapses, regardless of a detection result of a human detecting sensor, and set the light modulation level of the LED to a second light modulation level that is lower than the first light modulation level when the first time period elapses. The controller is configured to set, when the human detecting sensor detects a person in a state where the light modulation level of the LED is set to the second light modulation level, the light modulation level of the LED to the first light modulation level for a predetermined time period.

9 Claims, 5 Drawing Sheets

(51) Int. Cl.
*F21V 23/04* (2006.01)
*F21S 8/08* (2006.01)
*F21W 131/10* (2006.01)
*F21Y 101/02* (2006.01)

(52) U.S. Cl.
CPC ........ H05B37/0218 (2013.01); H05B 37/0227 (2013.01); H05B 37/0281 (2013.01); *F21W 2131/10* (2013.01); *F21Y 2101/02* (2013.01); *Y02B 20/44* (2013.01); *Y02B 20/46* (2013.01); *Y02B 20/72* (2013.01)

LIGHTING FIXTURE INCLUDING HUMAN DETECTING SENSOR

RELATED APPLICATIONS

This application is the U.S. National Phase under 35 U.S.C. §371 of International Application No. PCT/JP2013/006282, filed on Oct. 24, 2013, which in turn claims the benefit of Japanese Application No. 2012-238042, filed on Oct. 29, 2012, the disclosures of which Applications are incorporated by reference herein.

TECHNICAL FIELD

This invention relates to a lighting fixture.

BACKGROUND ART

For example, a lighting fixture that is attached to an end of a pole and used as a street light or a roadway light is disclosed in Document 1 (JP 2010-272325A). The lighting fixture includes a lamp body whose overall shape is formed substantially in a sphere, and a light source that is housed inside the lamp body. Also, the lamp body includes a cover shaped like a hemisphere, a globe shaped like a hemisphere having light transmitting property, a reflecting mirror configured to reflect light from the light source downward, and a holder into which the pole is inserted and fixed.

With the lighting fixture, light that is radiated from the light source and light that is reflected by the reflecting mirror pass through the globe that is arranged below the light source, and the light that has passed through the globe is radiated downward around the entire circumference centered on the pole.

A metal halide lamp is used as the light source in the lighting fixture described in Document 1, and ON/OFF control by an EE (electric eye) switch or the like can be performed. However, light modulation control cannot be performed with this lighting fixture, and accordingly, only lighting at an output level of 100% is possible even in a state where nobody is present, and as a result power consumption is high.

DISCLOSURE OF INVENTION

The present invention has been made in view of the above-described problems, and an object of the present invention is to provide a lighting fixture in which power consumption is suppressed.

A lighting fixture of a first aspect according to the present invention includes: an LED; a human detecting sensor configured to detect a person; and a controller configured to set a light modulation level of the LED in accordance with a detection result of the human detecting sensor. The controller is configured to set the light modulation level to a first light modulation level in a period from a beginning of a night time slot until when a predetermined first time period elapses, regardless of the detection result of the human detecting sensor. The controller is configured to set the light modulation level to a second light modulation level that is lower than the first light modulation level when the first time period elapses. The controller is configured to set, when the human detecting sensor detects a person in a state where the light modulation level is set to the second light modulation level, the light modulation level to the first light modulation level for a predetermined time period.

As a lighting fixture of a second aspect according to the present invention, in the first aspect, the controller is configured to set the light modulation level to the second light modulation level regardless of the detection result of the human detecting sensor, when a predetermined second time period elapses after the first time period has elapsed.

As a lighting fixture of a third aspect according to the present invention, in the second aspect, a time slot after the second time period has elapsed is a late-night time slot, during the night time slot, in which the number of persons is small.

As a lighting fixture of a fourth aspect according to the present invention, in any one of the first to third aspects, a time slot from the beginning of the night time slot until when the first time period elapses is a time slot, during the night time slot, in which the number of persons is relatively large.

As a lighting fixture of a fifth aspect according to the present invention, in any one of the first to fourth aspects, the controller is configured to detect the beginning of the night time slot with an automatic lighting controller configured to control at least power supply to the controller.

As a lighting fixture of a sixth aspect according to the present invention, in any one of the first to fourth aspects, the controller is configured to take a preset time as the beginning of the night time slot.

DESCRIPTION OF EMBODIMENTS

Hereinafter, an embodiment of a lighting fixture will be described with reference to FIGS. 1 to 6. The lighting fixture 7 according to the present embodiment is attached to an end of a pole 1 (refer to FIG. 4A) that stands from the ground, for example, and is used as a street light, a park light, and a roadway light that are used to illuminate the ground around the pole 1. In the following description, unless specifically noted, vertical and horizontal directions are defined based on the orientation shown in FIG. 4A. That is, a longitudinal direction of the pole 1 is the vertical direction.

The lighting fixture 7 according to the present embodiment includes, as shown in FIGS. 4A and 4B, a connection unit 2 that is attached to the end of the pole 1, and a lamp device 3 that is attached to the pole 1 via the connection unit 2.

Figure 6:
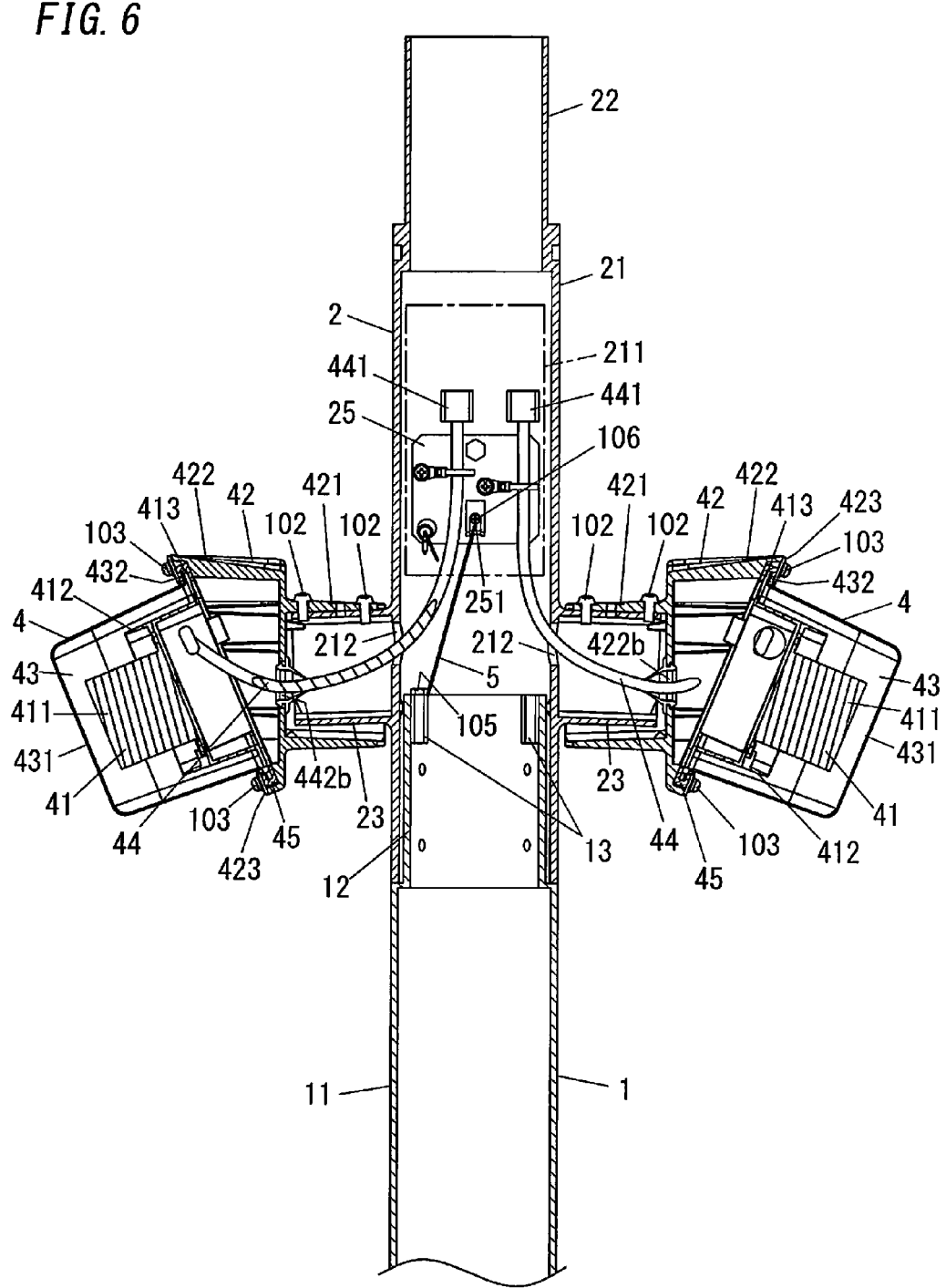
FIG. 6 is a cross-sectional view of a connection unit used in the lighting fixture according to the embodiment in which a portion thereof has been omitted.

The pole 1 includes a pole body 11 formed by a vertically long steel pipe (such as carbon steel pipe (STK400)). A small diameter portion 12 is integrally provided at an end (upper end) of the pole body 11, as shown in FIGS. 4A and 4B and FIG. 6. Also, nut portions 13, 13 are welded at two sides, in the horizontal direction, of an upper end portion of an inner side surface of the small diameter portion 12 (refer to FIG. 6). A fixing screw 105 for fixing one end of a wire 5 is screwed to one of the nut portions 13.

The connection unit 2 includes a unit body 21 formed by a vertically long steel pipe (such as STK400). A small diameter portion 22 is integrally provided at a tip (upper end) of the unit body 21, as shown in FIG. 6. Also, a vertically long rectangular opening portion 211 is provided in an outside surface of the unit body 21. The opening portion 211 is provided for performing an operation of fixing the other end of the wire 5 to a tension metal fitting 25 that is attached to an inner surface of the unit body 21, and is closed with a cover 24 after the above operation (refer to FIG. 4A).

Also, tubular mounted portions 23, 23, to which later-described sensor devices 4 are detachably attached, are respectively provided at two sides, in the horizontal direction, of the unit body 21 below the opening portion 211. Two screw holes (not shown) into which fixing screws 102 for fixing each sensor device 4 are screwed are provided in an outside surface of each mounted portion 23. Also, a cable insertion hole 212 for passing an electric cable 44 (power supply line and light modulation signal line) that is electrically connected to a human detecting sensor 41 of the sensor device 4 is provided in a bottom surface portion of each mounted portion 23.

Note that a connector 441 is provided at a tip of each electric cable 44, and the connector 441 is connected to a connector (not shown) provided at a tip of an electric cable (not shown) that is electrically connected to a later-described control unit 51.

Here, the tension metal fitting 25 to which the other end of the wire 5 is fixed is formed in a horizontally long rectangular board-like shape, as shown in FIG. 6. Also, an L-shaped fixing portion 251 that is formed by cutting and raising a portion of the tension metal fitting 25 is provided at a horizontally central portion and a vertically lower end portion of the tension metal fitting 25. A fixing screw 106 is attached to the fixing portion 251 by being screwed therein, the fixing screw 106 and the fixing portion 251 sandwich the other end of the wire 5, and as a result the wire 5 is fixed to the tension metal fitting 25.

Each sensor device 4 includes a radio wave human detecting sensor 41 for detecting a person using the Doppler effect, for example, a metal fitting 42 for attaching the human detecting sensor 41 to the connection unit 2, and a cover 43 that is attached to the metal fitting 42 so as to cover the human detecting sensor 41. The human detecting sensor 41 includes a sensor body 411 that is formed in a rectangular box-like shape, and a support base 412 supporting the sensor body 411. A flange portion 413 that extends outward is integrally provided at a lower end edge of the support base 412.

The cover 43 includes a cover body 431 formed in a rectangular box-like shape of which one surface is open. A flange portion 432 that extends outward is integrally provided at an opening end edge of the cover body 431. Here, in a state where the human detecting sensor 41 and the cover 43 are assembled, a non-metallic seal 45 is attached so as to sandwich the flange portion 413 of the support base 412 and the flange portion 432 of the cover body 431, as shown in FIG. 6.

Each metal fitting 42 includes a tubular support portion 421 to which the mounted portion 23 provided in the unit body 21 is inserted. Insertion holes (not shown) are provided in an outside surface of the support portion 421 for inserting the fixing screws 102 at the positions where the respective screw holes provided in the mounted portion 23 overlap. Also, a mounting portion 422 formed in a box-like shape of which one surface is open is integrally provided at a tip of the support portion 421. A frame body 423 including an opening portion to which the cover body 431 of the cover 43 can be inserted is attached to an opening surface of the mounting portion 422 using fixing screws 103.

Furthermore, a cable insertion hole 422b for passing the electric cable 44 that is electrically connected to the human detecting sensor 41 is provided in a bottom surface portion of the mounting portion 422. Here, in a state where the human detecting sensor 41 and the cover 43 are assembled to the metal fitting 42, an opening end edge of the mounting portion 422 and frame sides of the frame body 432 sandwich the non-metallic seal 45 attached to the cover 43, and as a result the human detecting sensor 41 and the cover 43 are held to the metal fitting 42, as shown in FIG. 6. Note that the assembly procedure of the sensor device 4 will be described later.

Figure 5:
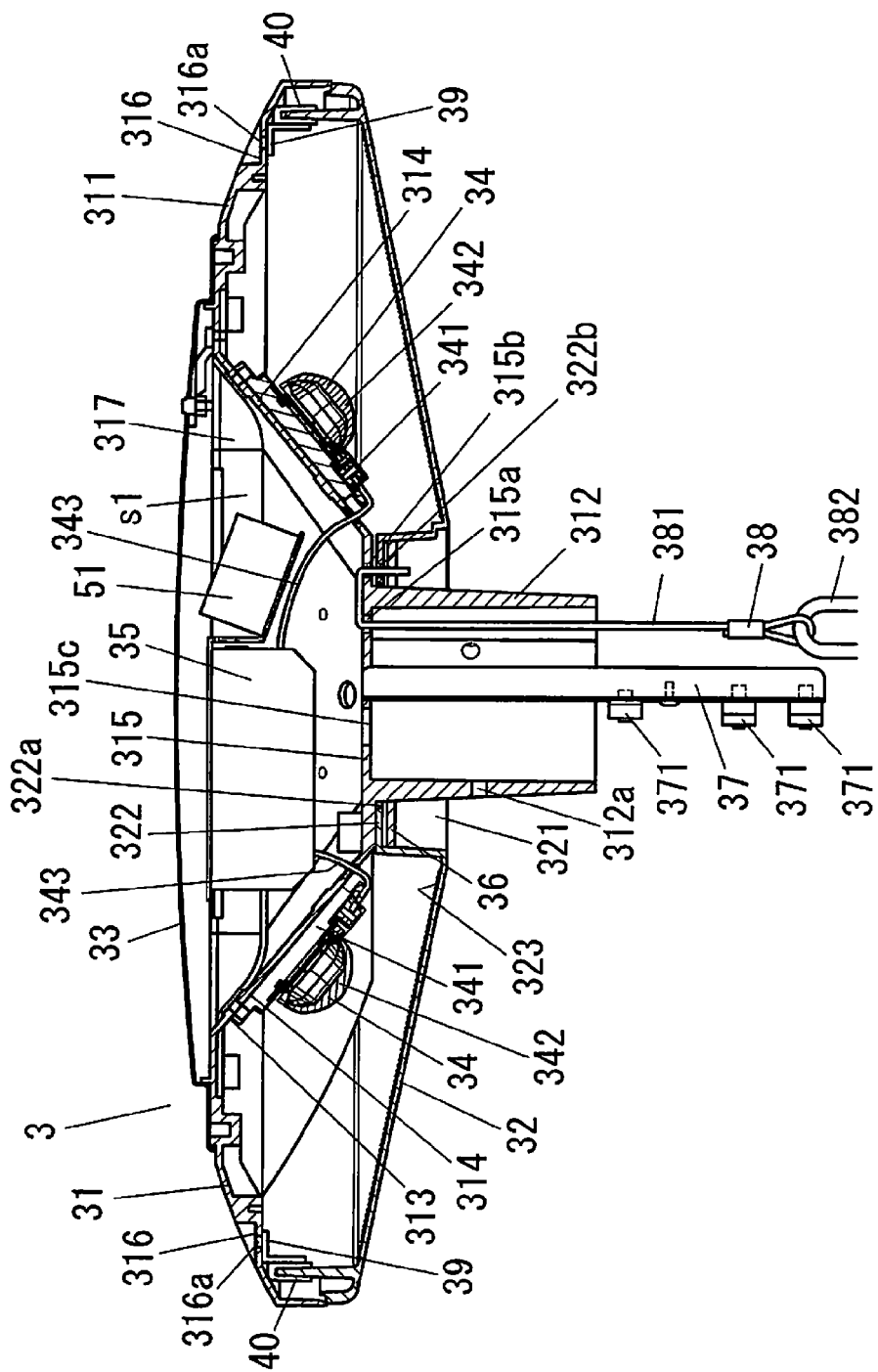
FIG. 5 is a cross-sectional view of a lamp device used in the lighting fixture according to the embodiment.

The lamp device 3 includes, as shown in FIG. 5, light source units 34, a power supply unit 35 configured to supply electric power to the light source units 34, a control unit 51 (controller) configured to control the lighting state of the light source units 34, and a lamp device body 31 that holds the light source unit 34, the power supply unit 35, and the control unit 51. Also, the lamp device 3 includes a globe 32 that is attached to the lamp device body 31 so as to cover the light source units 34, and a cover 33 that covers an upper side opening of the lamp device body 31.

Each light source unit 34 includes a heat dissipation member 341 made of a material having high thermal conductivity (such as aluminum, an aluminum alloy, copper, or stainless steel). A mounting substrate (not shown) on which an LED is mounted is attached to an upper surface (lower surface, in FIG. 5) of the heat dissipation member 341. Also, the light source unit 34 includes a lens unit 342 shaped like a dome for controlling the directional distribution of light that is radiated from the LED. The lens unit 342 is attached to the heat dissipation member 341 so as to cover the LED.

The control unit 51 is configured to generate a light modulation signal in accordance with a detection result of the sensor device 4, and output the signal to the power supply unit 35. The power supply unit 35 is configured to supply electric power in accordance with the light modulation signal to the light source unit 34. Note that the detailed description will be given later.

The lamp device body 31 is formed by a metal material (such as aluminum, an aluminum alloy, or stainless steel). Also, the lamp device body 31 includes a main body portion 311 shaped like a bowl in which a lower surface and an upper surface are open, a holding portion 313 formed in a hollow truncated square pyramid shape that holds the light source units 34, and a fixing portion 312 that is integrally provided in a flat plate portion 315 of the holding portion 313 and is fixed to the connection unit 2.

The main body portion 311 is formed in a bowl-like shape, as described above. A circular opening portion 317 is provided at the center of the upper surface of the main body portion 311, and furthermore, two or more recessed portions 316 are provided outside the opening portion 317 along a circumferential direction. Also, an insertion hole 316a for inserting a fixing screw (not shown) is provided in a bottom portion of each recessed portion 316. Furthermore, the holding portion 313 having a truncated square pyramid shape is integrally formed in an opening end edge of the opening portion 317.

A cover 33 that is formed to have an outer diameter dimension larger than the opening dimension of the opening portion 317 is detachably attached to the opening portion 317 of the main body portion 311. The cover 33 is attached to or detached from the opening portion 317 when the setting (light modulation level of the light source unit 34, and the like) of the control unit 51 is changed, or the power supply unit 35 and the control unit 51 are replaced, for example.

The holding portion 313 is formed in a truncated square pyramid shape with the flat plate portion 315 and four slope portions 314 that extend from the end edges of the flat plate portion 315 and slope outward toward the upper side, and is integrated to the main body portion 311 at the upper end portions of the slope portions 314. Also, one light source unit 34 is attached to a lower surface of each slope portion 314, and the light from each light source unit 34 is radiated obliquely downward.

Also, a cylindrical fixing portion 312 is integrally formed in the center of a lower portion of the flat plate portion 315. Furthermore, insertion holes 315a, 315b for inserting a wire 381 of a later-described dropout prevention device 38, and an insertion hole 315c for inserting an electric cable (not shown) that is electrically connected to the control unit 51 are provided in the flat plate portion 315.

Here, a white coating is applied to the slope portions 314 and an inner circumferential surface of the main body portion 311, and accordingly, the reflectivity of light that is radiated from the light source unit 34 is improved. Also, the insertion holes 315a, 315c are provided at the positions communicating with the inside of the tube of the fixing portion 312, and the insertion hole 315b is provided at a position outside the fixing portion 312. Furthermore, the power supply unit 35 and the control unit 51 are arranged inside a space s1 that is surrounded by the flat plate portion 315 and the four slope portions 314, and light from the light source unit 34 is not blocked by the power supply unit 35 and the control unit 51.

The fixing portion 312 holds the lamp device 3 in a state where a small diameter portion 22 (refer to FIG. 6) provided in the unit body 21 of the connection unit 2 is inserted into the tube of the fixing portion 312, and the inner diameter dimension of the tube is set slightly to be larger than the outer diameter dimension of the small diameter portion 22. Also, the outer diameter dimension of the fixing portion 312 is set to be approximately the same as the outer diameter dimension of the unit body 21, and the lamp device 3 can be attached to the unit body 21 in a state where no step is formed at the joint portion (refer to FIGS. 4A and 4B).

Furthermore, a screw hole 312a is provided in a side surface of the fixing portion 312, and the lamp device 3 is fixed to the unit body 21 by the tip of a fixing screw (not shown) that is screwed into the screw hole 312a being brought into contact with the outside surface of the small diameter portion 22.

Also, a fixing member 37 for fixing the electric cable (not shown), from the control unit 51, that is wired into the tube of the fixing portion 312 through the insertion hole 315c is arranged inside the tube. Two or more (three, in FIG. 5) tension fittings 371 are provided in the fixing member 37. The electric cable that is wired along the longitudinal direction (vertical direction in FIG. 5) of the fixing member 37 is fixed to the fixing member 37 using these tension fittings 371.

Note that a connector (not shown) is provided at the tip of the electric cable. The connector 441 provided at the tip of the electric cable 44 that is electrically connected to the human detecting sensor 41 of the sensor device 4 is connected to the connector, and as a result the human detecting sensor 41 and the control unit 51 are electrically connected.

The globe 32 is formed by a member having light transmitting property (such as an acrylic resin, or the like) in a bowl-like shape in which an upper surface is open. A recessed portion 321 having an opening dimension larger than the outer diameter dimension of the fixing portion 312 of the lamp device body 31 is provided at the center of a lower surface of the globe 32. An insertion hole 322a having a diameter set slightly larger than the outer diameter dimension of the fixing portion 312 is provided in a bottom portion 322 of the recessed portion 321.

Also, an insertion hole 322b for inserting the wire 381 is provided in the bottom portion 322 of the recessed portion 321. Furthermore, in the globe 32, metal fittings 39 each including a screw hole (not shown) are attached to portions corresponding to respective recessed portions 316 provided in the main body portion 311 of the lamp device body 31. After the globe 32 is assembled to the lamp device body 31, the fixing screws (not shown) each inserted into the insertion hole 316a of the recessed portion 316 are each screwed to the screw hole of the metal fitting 39, and as a result the globe 32 is fixed to the lamp device body 31.

Also, a prism portion 323 having a plurality of asperities is provided on an inner surface (upper surface in FIG. 5) of the globe 32, and light from the light source unit 34 is diffused by the prism portion 323 and is radiated outside. Here, in a state where the globe 32 is attached to the lamp device body 31, the insertion hole 315b of the flat plate portion 315 communicates with the insertion hole 322b of the bottom portion 322.

Also, the globe 32 is also fixed to the lamp device body 31 using a metal fitting 36 shaped like a ring that has been passed through the fixing portion 312 of the lamp device body 31. Fixing screws (not shown) that are inserted into insertion holes (not shown) provided in the metal fitting 36 are screwed into screw holes (not shown) provided in the flat plate portion 315 of the lamp device body 31, and thereby the bottom portion 322 of the recessed portion 321 of the globe 32 is sandwiched between the flat plate portion 315 of the lamp device body 31 and the metal fitting 36, and as a result the globe 32 is fixed to the lamp device body 31.

Note that circular non-metallic seals (not shown) are respectively inserted between the flat plate portion 315 of the lamp device body 31 and the bottom portion 322 of the recessed portion 321 of the globe 32, and between the bottom portion 322 of the recessed portion 321 and the metal fitting 36, and as a result waterproofness is ensured.

Here, a non-metallic seal 40 shaped like a ring is attached in the vicinity of an outer edge of the globe 32, and waterproofness between the globe 32 and the lamp device body 31 is ensured by the non-metallic seal 40. However, in the case where the globe 32 is attached to the lamp device body 31 merely by the above-described metal fitting 36, waterproofness may not be ensured due to weak adhesiveness at the outer edge portion.

Accordingly, in the present embodiment, fixing screws each inserted into the insertion hole 316a of the recessed portion 316 of the lamp device body 31 are each screwed to the screw hole of the metal fitting 39, and thereby the adhesiveness between the globe 32 and the lamp device body 31 at the outer edge portion is improved, and the waterproofness is ensured.

Incidentally, one end of the wire 381 of the dropout prevention device 38 is attached to the metal fitting 36, as shown in FIG. 5. The other end side of the wire 381 passes through the insertion hole 322b of the bottom portion 322 of the recessed portion 321 in the globe 32 and the insertion hole 315b of the flat plate portion 315 of the lamp device body 31, passes through the insertion hole 315a of the flat plate portion 315, and is inserted into the tube of the fixing portion 312. A weight 382 is attached to the tip of the other end of the wire 381.

When the fixing screws (not shown) that fix the metal fitting 36 are removed in a state where the lamp device 3 is assembled, the globe 32 and the metal fitting 36 move away from the lamp device body 31 (downward, in FIG. 5) due to the weight of the globe 32. At this time, the globe 32 can be prevented from dropping by the weight 382 attached to the wire 381 being engaged in an end edge portion of the insertion hole 315a of the flat plate portion 315.

Next the assembly procedure of the lamp device 3 will be described. Note that the following description will be given assuming that the fixing member 37 is attached to the fixing portion 312 in advance. First, an operator attaches the light source units 34 to the respective slope portions 314 of the holding portion 313 of the lamp device body 31, and arranges the power supply unit 35 and the control unit 51 inside the space s1 surrounded by the flat plate portion 315 and the slope portions 314.

Subsequently, the operator connects the light source units 34 to the power supply unit 35 with power supply lines 343, and fixes the electric cable (not shown) that is electrically connected to the control unit 51 to the fixing member 37 after arranging the electric cable inside the tube of the fixing portion 312 through the insertion hole 315c.

The operator then fixes the globe 32 to the lamp device body 31 using the metal fitting 36, after assembling the globe 32 to the lamp device body 31 from the lower side, and furthermore screws each of the fixing screws that are each inserted into the insertion hole 316a of the recessed portion 316 provided in the main body portion 311 of the lamp device body 31 into the corresponding screw hole of the metal fitting 39. Accordingly, the lamp device body 31 and the globe 32 are coupled in a more adhered state.

At this time, the fixing portion 312 of the lamp device body 31 passes through the insertion hole 322a provided in the bottom portion 322 of the recessed portion 321 in the globe 32, and is placed in a state of being exposed to the outside, with a portion of the exposed portion being housed inside the recessed portion 321 of the globe 32 (refer to FIG. 5). Finally, the operator passes the one end side of the wire 381 of the dropout prevention device 38 through the insertion holes 315a, 315b, and 322b, fixes the one end thereof to the metal fitting 36, and thereafter closes the opening portion 317 of the lamp device body 31 with the cover 33 to complete the assembly of the lamp device 3.

Subsequently, the assembly procedure of each sensor device 4 will be described. First, the operator assembles the human detecting sensor 41 and the cover 43, and then attaches the non-metallic seal 45 so as to sandwich the flange portion 413 of the support base 412 and the flange portion 432 of the cover body 431. Next, the operator passes the electric cable 44 connected to the human detecting sensor 41 through the cable insertion hole 422b provided in the mounting portion 422 of the metal fitting 42, and thereafter mounts the human detecting sensor 41 and the cover 43 that are integrally assembled on the opening end edge of the mounting portion 422.

Then the operator assembles the frame body 423 to the mounting portion 422 while inserting the cover body 431 of the cover 43 through the opening portion of the frame body 423, and thereafter fixes the frame body 423 to the mounting portion 422 using the fixing screws 103 to complete the assembly of the sensor device 4. At this time, as a result of the non-metallic seal 45 attached to the cover 43 being sandwiched between the opening end edge of the mounting portion 422 and the frame side of the frame body 432, the human detecting sensor 41 and the cover 43 are held to the metal fitting 42.

Furthermore, the procedure for attaching each sensor device 4 to the connection unit 2 will be described. First, the operator inserts the electric cable 44 that is electrically connected to the human detecting sensor 41 of the sensor device 4 into the tube of the mounted portion 23, and routes the cable inside the unit body 21 through the cable insertion hole 212 of the unit body 21.

Next, the operator inserts the mounted portion 23 into the tube of the support portion 421 of the metal fitting 42, and thereafter aligns the insertion holes (not shown) of the support portion 421 with the respective screw holes (not shown) of the mounted portion 23. Finally, the operator screws the fixing screws 102 inserted to the respective insertion holes to the respective screw holes, and as a result the sensor device 4 is attached to the connection unit 2.

Subsequently, the procedure for attaching the connection unit 2 and the lamp device 3 to the pole 1 will be described. First, the operator sandwiches one end of the wire 5 between the fixing screw 105 screwed to one of the nut portions 13 (left side, in FIG. 6) provided in the small diameter portion 12 of the pole 1 and the nut portion 13, and fixes the wire 5. Next, the operator inserts the small diameter portion 12 inside the tube of the unit body 21 through the lower end thereof, and thereafter fixes the unit body 21 to the pole body 11 using fixing screws 104.

Furthermore, the operator pulls the other end side of the wire 5 up through the opening portion 211 provided in the unit body 21, and thereafter fixes the other end of the wire 5 to the fixing portion 251 of the tension metal fitting 25 attached inside the tube of the unit body 21. Accordingly, the connection unit 2 can be prevented from dropping out of the pole 1.

Next, the operator inserts the small diameter portion 22 into the tube of the fixing portion 312 while inserting the fixing member 37 and the dropout prevention device 38 that are provided in the lamp device 3 into the tube of the small diameter portion 22 of the connection unit 2, and thereafter fixes the fixing portion 312 to the small diameter portion 22 using the fixing screw (not shown). Furthermore, the operator connects each of the connectors (not shown) provided in the electric cables (not shown) that are electrically connected to the control unit 51 to the corresponding connector 441 provided in the electric cable 44 that is electrically connected to the corresponding human detecting sensor 41, through the opening portion 211 provided in the unit body 21.

And finally, the operator closes the opening portion 211 of the unit body 21 with the cover 24, and then fixes the cover 24 to the unit body 21 using the fixing screws 101 to complete the attachment of the connection unit 2 and the lamp device 3 to the pole 1.

Figure 1:
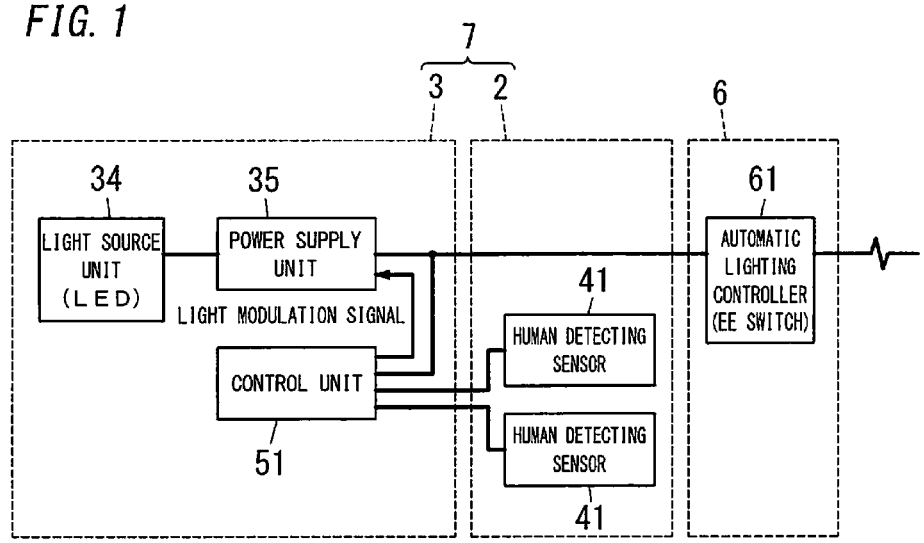
FIG. 1 is a schematic block diagram of a lighting fixture according to an embodiment.
Figure 2:
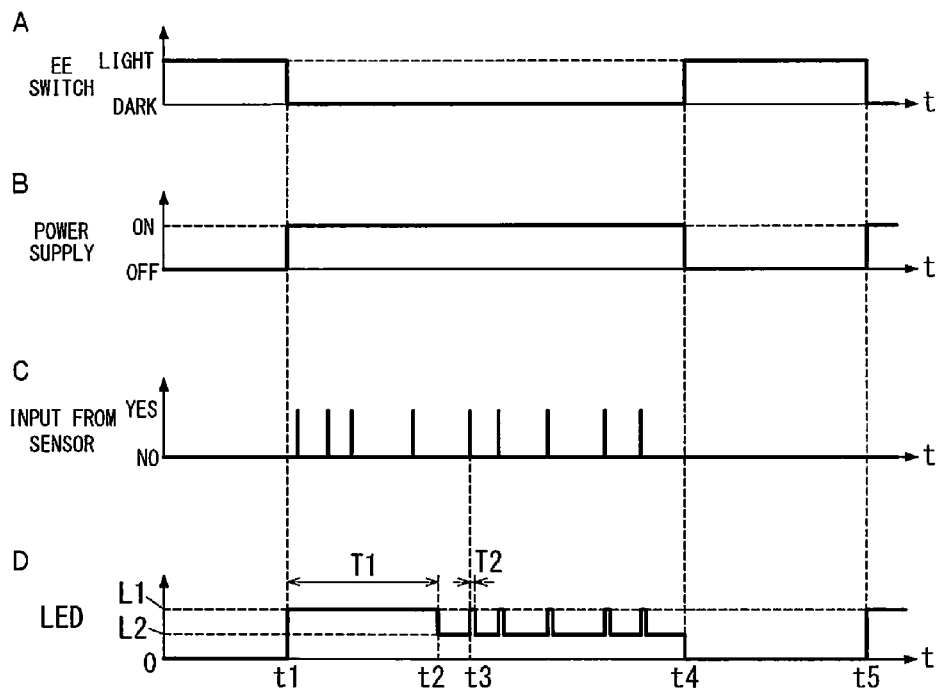
FIGS. 2A to 2D are time charts for illustrating operations of the lighting fixture according to the embodiment.
Figure 3:
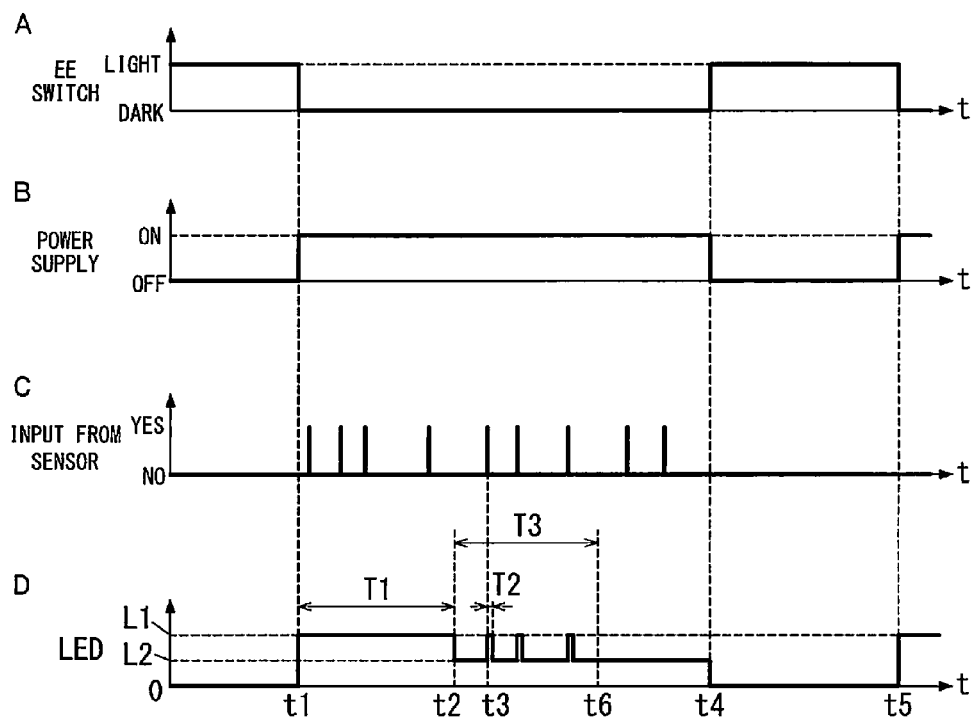
FIGS. 3A to 3D are time charts for illustrating another operations of the lighting fixture according to the embodiment.
Figure 4:
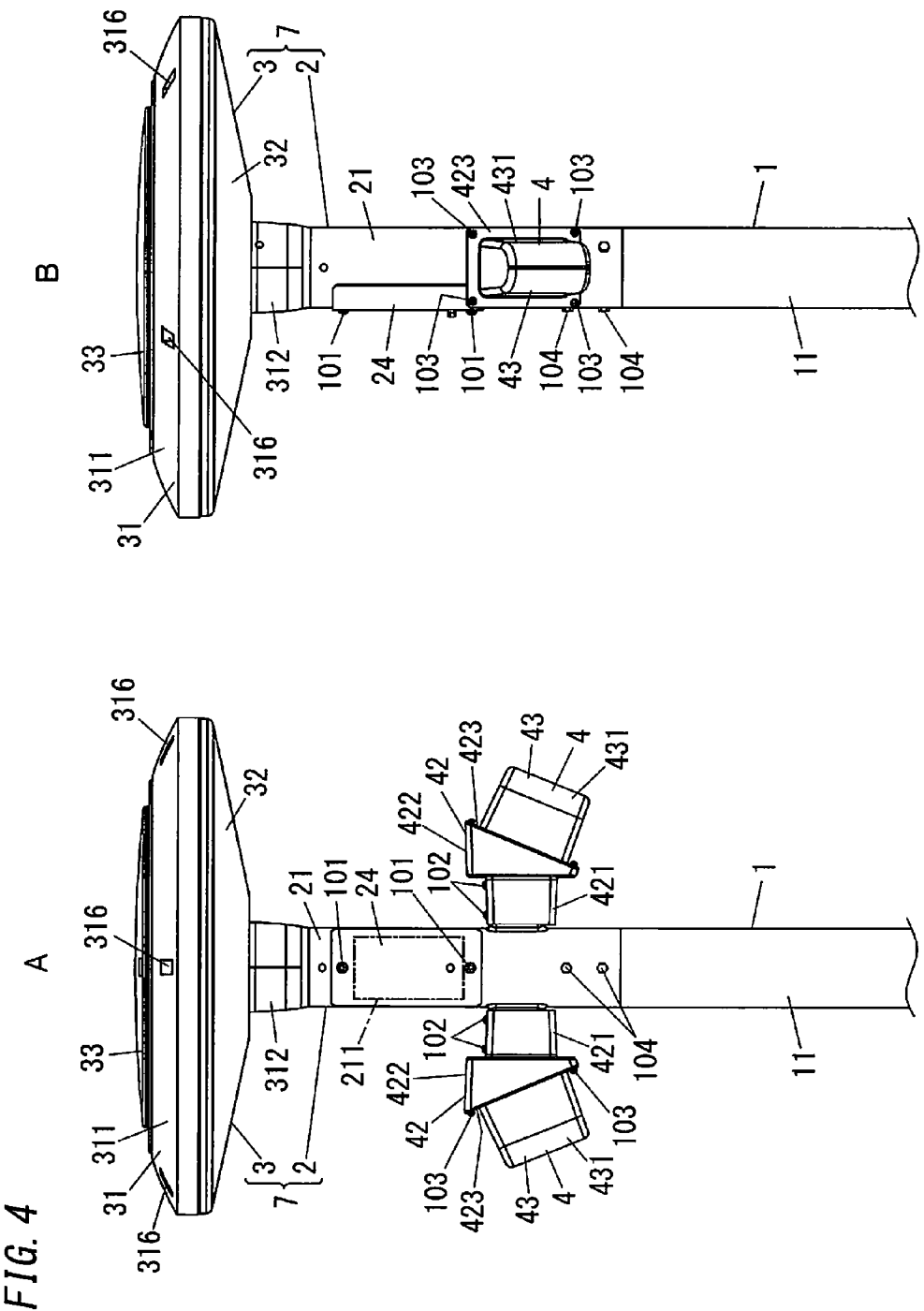
FIGS. 4A and 4B are external views of the lighting fixture according to the embodiment in which a portion thereof has been omitted.

Here, FIG. 1 is a schematic block diagram illustrating an example of the lighting fixture 7 according to the present embodiment. Predetermined electric power is supplied to the power supply unit 35 and the control unit 51 that are provided in the lamp device 3 via an automatic lighting controller 61 built in a distribution board 6. Specifically, in the present embodiment, an EE switch is used as the automatic lighting controller 61. Here, the EE switch is a switch that switches a contact on or off depending on the illuminance in the surrounding area.

That is, when the surrounding area becomes dark and the illuminance in the surrounding area falls to a predetermined illuminance or less, the EE switch is turned on and power supply to the power supply unit 35 and the control unit 51 is started. Also, when the surrounding area becomes light and the illuminance in the surrounding area increases to higher than the predetermined illuminance, the EE switch is turned off and the power supply to the power supply unit 35 and the control unit 51 is stopped.

Also, when the power supply is started, the control unit 51 supplies operating power to the human detecting sensors 41 that are attached to the connection unit 2, and each human detecting sensor 41, upon detecting a person, outputs a predetermined detection signal to the control unit 51. Then, the control unit 51, upon receiving the detection signal from the human detecting sensor 41, generates a light modulation signal including a light modulation level of the light source units 34 in accordance with the detection signal, and outputs the generated light modulation signal to the power supply unit 35.

The power supply unit 35 supplies electric power according to the light modulation level included in the light modulation signal inputted from the control unit 51 to the light source units 34, and lights the LEDs of the light source units 34 at a predetermined light modulation level. Here, the light modulation level of the light source unit 34 includes a light modulation ratio of 100% (fully lighted) in addition to light modulation ratios of less than 100%.

Next, operations of the lighting fixture 7 will be described, with reference to time charts shown in FIGS. 2A to 2D. In a state where the illuminance in the surrounding area is higher than a predetermined illuminance (that is, in a light state) (before time t1), the EE switch is in an off-state, and the power supply to the power supply unit 35 and the control unit 51 is stopped. At this time, because the power supply to the light source units 34 is stopped, all the LEDs are in an unlighted state.

At time t1, when the illuminance in the surrounding area falls to the predetermined illuminance or less (that is, in a dark state), the EE switch is turned on, and power is supplied to the power supply unit 35 and the control unit 51. At this time, the control unit 51 supplies operating power to the human detecting sensors 41, generates a light modulation signal for setting the light modulation level of the light source units 34 to a first light modulation level L1 (light modulation ratio of 100%, for example), and outputs the generated signal to the power supply unit 35.

Then, the power supply unit 35 outputs the electric power according to the first light modulation level L1 included in the light modulation signal to the light source units 34 so as to light the LEDs in the light source units 34 at the first light modulation level L1. Note that, at this time, the control unit 51 starts clocking a predetermined first time period T1 with a timer (not shown). Here, in this example, the EE switch detects the beginning of a night time slot (that is, a state where the surrounding area is dark), and the first time period T1 is defined as a fixed period from the beginning of the night time slot.

In the period from time t1 to time t2 when the first time period T1 elapses, the control unit 51 sets the light modulation level of the light source units 34 to the first light modulation level L1, regardless of whether or not there is an input(s) from the human detecting sensors 41 (that is, whether or not a person is detected). Accordingly, the LEDs of the light source units 34 light at the first light modulation level L1.

At time t2, the control unit 51 sets the light modulation level of the light source units 34 to a second light modulation level L2 (light modulation ratio of 50%, for example) that is lower than the first light modulation level L1, generates a light modulation signal including the second light modulation level L2, and outputs the generated signal to the power supply unit 35. The power supply unit 35, upon receiving the light modulation signal from the control unit 51, generates electric power according to the second light modulation level L2 that is included in the light modulation signal, and outputs the generated power to the light source units 34 so as to light the LEDs of the light source units 34 at the second light modulation level L2.

Next, at time t3, when one of the human detecting sensors 41 detects a person and outputs a predetermined detection signal to the control unit 51, the control unit 51 generates a light modulation signal for setting the light modulation level of the light source units 34 to the first light modulation level L1 in accordance with the detection signal, and outputs the generated signal to the power supply unit 35. The power supply unit 35, upon receiving the light modulation signal from the control unit 51, generates electric power according to the first light modulation level L1 included in the light modulation signal, and outputs the above electric power to the light source units 34 only for a predetermined time period T2.

The LEDs of the light source units 34 light at the first light modulation level L1 only for the predetermined time period T2 due to the above electric power. Note that when the predetermined time period T2 has elapsed, the control unit 51 generates a light modulation signal for setting the light modulation level of the light source units 34 to the second light modulation level L2, and thereafter similar subsequent processing as described above is performed, and the LEDs of the light source units 34 light at the second light modulation level L2 until the next detection signal is inputted.

At time t4, when the illuminance in the surrounding area increases to higher than the predetermined illuminance, the EE switch is turned off, and the power supply to the power supply unit 35 and the control unit 51 is stopped. Accordingly, the power supply to the light source units 34 is also stopped, and as a result all the LEDs are turned off. Also, at time t5, when the illuminance in the surrounding area falls to the predetermined illuminance or less, the operations performed in the period from time t1 to time t4 described above are performed.

Here, in the present embodiment, the time slot from when the surrounding area became dark until when the surrounding area becomes light again, that is, the time slot during which the illuminance in the surrounding area is the predetermined illuminance or less, is taken as the night time slot. A time slot that is determined to be a night time slot by the user may be set as the night time slot.

According to the present example, when the first time period T1 has elapsed, the light modulation level of the light source units 34 is set to the second light modulation level L2 that is lower than the first light modulation level L1, and the light modulation level is temporarily set to the first light modulation level L1 only when the human detecting sensor(s) 41 detects a person. Accordingly, power consumption can be suppressed compared with the case where the light modulation level of the light source unit 34 is maintained at the first light modulation level L1.

That is to say, according to the present example, a certain illumination can be obtained by the LEDs being fully lighted (lighted at 100% output) in a time slot when there is a relatively large number of persons even in a night time slot. Also, power consumption can be suppressed by performing light modulation control in accordance with the detection result of the human detecting sensors 41, when the number of persons decreases.

Also, in the case where, in a time slot when there are many persons, the light modulation level is changed in accordance with the detection result of the human detecting sensors 41, the frequent change in the brightness of the LEDs may give persons an odd feeling. In contrast to this, this odd feeling can be removed by maintaining the light modulation level of the LEDs at a certain level (first light modulation level L1) in a time slot when there are many persons, as in the present example.

Next, other operations of the lighting fixture 7 will be described, with reference to time charts shown in FIGS. 3A to 3D. In a state where the illuminance in the surrounding area is higher than the predetermined illuminance (that is, in a light state) (before time t1), the EE switch is in an off-state, and the power supply to the power supply unit 35 and the control unit 51 is stopped. At this time, because the power supply to the light source units 34 is also stopped, all the LEDs are in an unlighted state.

At time t1, when the illuminance in the surrounding area falls to the predetermined illuminance or less (that is, in a dark state), the EE switch is turned on, and the power supply to the power supply unit 35 and the control unit 51 is started. At this time, the control unit 51 supplies operation power to the human detecting sensors 41, generates a light modulation signal for setting the light modulation level of the light source units 34 to the first light modulation level L1 (light modulation ratio of 100%, for example), and outputs the generated signal to the power supply unit 35.

Then, the power supply unit 35 supplies the electric power according to the first light modulation level L1 included in the light modulation signal to the light source units 34 so as to light the LEDs of the light source units 34 at the first light modulation level L1. Note that, at this time, the control unit 51 starts clocking the predetermined first time period T1 with a timer (not shown). Here, in the present example also, the beginning of the night time slot (that is, a state where the surrounding area is dark) is detected by the EE switch, and the first time period T1 is defined as a predetermined period of time from the beginning of the night time slot.

In the period from time t1 to time t2 when the first time period T1 elapses, the control unit 51 sets the light modulation level of the light source units 34 to the first light modulation level L1, regardless of whether or not there is an input from the human detecting sensors 41 (that is, whether or not a person is detected). Accordingly, the LEDs in the light source units 34 light at the first light modulation level L1.

At time t2, the control unit 51 sets the light modulation level of the light source units 34 to the second light modulation level L2 (light modulation ratio of 50%, for example) that is lower than the first light modulation level L1, and outputs a light modulation signal including the second light modulation level L2 to the power supply unit 35. The power supply unit 35, upon receiving the light modulation signal from the control unit 51, generates electric power according to the second light modulation level L2 included in the light modulation signal, and outputs the generated power to the light source units 34 so as to light the LEDs in the light source units 34 at the second light modulation level L2. Note that, at this time, the control unit 51 starts clocking the second time period T3 with the timer (not shown).

Next, at time t3, when one of the human detecting sensors 41 detects a person and outputs a predetermined detection signal to the control unit 51, the control unit 51 generates a light modulation signal for setting the light modulation level of the light source units 34 to the first light modulation level L1 in accordance with the detection signal, and outputs the generated signal to the power supply unit 35. The power supply unit 35, upon receiving the light modulation signal from the control unit 51, generates electric power according to the first light modulation level L1 included in the light modulation signal, and outputs the electric power to the light source units 34 only for the predetermined time period T2.

Then, the LEDs of the light source units 34 light at the first light modulation level L1 due to the electric power only for the predetermined time period T2. Note that, when the predetermined time period T2 elapses, the control unit 51 generates a light modulation signal for setting the light modulation level of the light source units 34 to the second light modulation level L2 until the next detection signal is inputted, and thereafter similar subsequent processing as described above is performed, and the LEDs of the light source units 34 light at the second light modulation level L2.

At time t6 when the second time period T3 has elapsed from time t2, the control unit 51 sets the light modulation level of the light source units 34 to the second light modulation level L2, regardless of whether or not there is an input from the human detecting sensors 41 (that is, whether or not a person is detected). Subsequently, the LEDs of the light source units 34 light at the second light modulation level L2.

At time t4, when the illuminance in the surrounding area increases to higher than the predetermined illuminance, the EE switch is turned off, and the power supply to the power supply unit 35 and the control unit 51 is stopped. Accordingly, the power supply to the light source units 34 is also stopped, and as a result all the LEDs are turned off. Also, at time t5, when the illuminance in the surrounding area falls to the predetermined illuminance or less, the operations in the period from time t1 to time t4 described above are performed.

According to the present example, after the second time period T3 has elapsed, the light modulation level of the light source units 34 is set to the second light modulation level L2 regardless of the detection result of the human detecting sensors 41, and as a result power consumption can be further suppressed compared with the above-described example (example shown in FIGS. 2A to 2D). That is, according to the present example, the light modulation level in a late-night time slot when the number of persons further decreases is fixed to the second light modulation level L2, and as a result the power consumption can be further suppressed.

Note that, in the present embodiment, although the first light modulation level L1 is set to the light modulation ratio of 100%, and the second light modulation level L2 is set to the light modulation ratio of 50%, the light modulation levels are not limited thereto, and may be other combinations as long as the first light modulation level L1 is higher than the second light modulation level L2. Also, although, in the present embodiment, the power supply to the power supply unit 35 and the control unit 51 is controlled by the EE switch, the control of the power supply to the power supply unit 35 and the control unit 51 is not limited thereto, and the power supply may be controlled with a timer.

Furthermore, the first time period T1, the second time period T3, and the predetermined time period T2 may be set appropriately, according to the installation place, the user, or the like. Also, although, in the present embodiment, the lighting fixture 7 to be attached to the pole 1 that stands from the ground has been described as an example, a thing to which the lighting fixture 7 is attached is not limited thereto, as long as the lighting fixture 7 is provided in a place where illumination is required when a person passes through.

Furthermore, although in the present embodiment, the beginning of the night time slot is detected by the EE switch, and the first time period T1 is set to a predetermined time period from the beginning of the night time slot, the first time period T1 may be set to a given time period (period until 9 PM, for example) from a preset time (7 PM, for example), which is taken as the beginning of the night time slot. Note that, in this case, the control unit 51 needs to be provided with a clocking function.

The lighting fixture 7 according to the present embodiment includes a light source unit 34 including an LED, a human detecting sensor 41 configured to detect a person, and a control unit 51 (controller) configured to set a light modulation level of the LED in accordance with a detection result of the human detecting sensor 41. The control unit 51 is configured to set the light modulation level of the LED to a first light modulation level L1 in a period from a beginning of a night time slot until when a predetermined first time period T1 elapses, regardless of the detection result of the human detecting sensor 41. Also, the control unit 51 is configured to set the light modulation level of the LED to a second light modulation level L2 that is lower than the first light modulation level L1 when the first time period T1 elapses. The control unit 51 is configured to set, when the human detecting sensor 41 detects a person in a state where the light modulation level of the LED is set to the second light modulation level L2, the light modulation level of the LED to the first light modulation level L1 for a predetermined time period T2.

As with the lighting fixture 7 according to the present embodiment, the control unit 51 is preferably configured to set the light modulation level of the LED to the second light modulation level L2 regardless of the detection result of the human detecting sensor 41, when a predetermined second time period T3 elapses after the first time period T1 has elapsed.

As with the lighting fixture 7 according to the present embodiment, a time slot after the second time period T3 has elapsed is preferably a late-night time slot, during the night time slot, in which the number of persons is small.

As with the lighting fixture 7 according to the present embodiment, a time slot from the beginning of the night time slot until when the first time period T1 elapses is preferably a time slot, during the night time slot, in which the number of persons is relatively large.

As with the lighting fixture 7 according to the present embodiment, the control unit 51 is preferably configured to detect the beginning of the night time slot with an automatic lighting controller 61 configured to control at least power supply to the control unit 51.

As with the lighting fixture 7 according to the present embodiment, the control unit 51 is preferably configured to take a preset time as the beginning of the night time slot.

The invention claimed is:

1. A lighting fixture comprising:
   an LED;
   a human detecting sensor configured to detect a person; and
   a controller configured to set a light modulation level of the LED in accordance with a detection result of the human detecting sensor;
   the controller being configured to set the light modulation level to a first light modulation level in a period from a beginning of a night time slot until when a predetermined first time period elapses, regardless of the detection result of the human detecting sensor,
   the controller being configured to set the light modulation level to a second light modulation level that is lower than the first light modulation level when the first time period elapses,
   the controller being configured to set, when the human detecting sensor detects a person in a state where the light modulation level is set to the second light modulation level, the light modulation level to the first light modulation level for a predetermined time period, and
   the controller being configured to set the light modulation level to the second light modulation level regardless of the detection result of the human detecting sensor, when a predetermined second time period elapses after the first time period has elapsed.

2. The lighting fixture according to claim 1, wherein a time slot after the second time period has elapsed is a late-night time slot, during the night time slot, in which a number of persons is small.

3. The lighting fixture according to claim 1, wherein a time slot from the beginning of the night time slot until when the first time period elapses is a time slot, during the night time slot, in which a number of persons is relatively large.

4. The lighting fixture according to claim 1, wherein the controller is configured to detect the beginning of the night time slot with an automatic lighting controller configured to control at least power supply to the controller.

5. The lighting fixture according to claim 1, wherein the controller is configured to take a preset time as the beginning of the night time slot.

6. The lighting fixture according to claim 2, wherein a time slot from the beginning of the night time slot until when the first time period elapses is a time slot, during the night time slot, in which a number of persons is relatively large.

7. The lighting fixture according to claim 2, wherein the controller is configured to detect the beginning of the night time slot with an automatic lighting controller configured to control at least power supply to the controller.

8. The lighting fixture according to claim 3, wherein the controller is configured to detect the beginning of the night time slot with an automatic lighting controller configured to control at least power supply to the controller.

9. The lighting fixture according to claim 6, wherein the controller is configured to detect the beginning of the night time slot with an automatic lighting controller configured to control at least power supply to the controller.

\* \* \* \* \*